United States Patent Office 3,337,595
Patented Aug. 22, 1967

3,337,595
FATTY ACID ESTERS OF POLYOXYPROPYLATED GLYCEROL
William A. Lamont, Oak Lawn, Ill., assignor to Nalco Chemical Company, Chicago, Ill., a corporation of Delaware
No Drawing. Original application Sept. 15, 1960, Ser. No. 56,126, now Patent No. 3,198,744, dated Aug. 3, 1965. Divided and this application Mar. 4, 1965, Ser. No. 437,259
4 Claims. (Cl. 260—410.6)

This application is a division of my copending application Ser. No. 56,126, filed Sept. 15, 1960, now U.S. Patent No. 3,198,744, issued Aug. 3, 1965.

The invention herein claimed relates to new compounds, i.e., fatty acid esters of polyoxypropylated glycerol. These compounds have proven useful for controlling, suppressing and/or preventing foaming of aqueous systems having foaming tendencies.

There are many industrial processes in which aqueous solutions or suspensions are processed. Frequently, due to the nature of the components in the aqueous system, foaming is a serious problem which must be prevented or mitigated to prevent interference by the foam with the efficient conduct of the processes.

Illustrative types of aqueous systems in which appreciable foaming occurs are cellulosic suspensions of the type used in the manufacture of various types of paper, sewage disposal systems, detergent-containing systems, saponin-containing systems, protein-containing systems and the like. In the paper industry foaming problems are encountered in black liquor, which is the spent cooking liquor obtained after cooking of wood pulp in accordance with the sulfate or kraft process, particularly during the evaporation of black liquor prior to recovery of the chemicals in the black liquor. Foaming is also a problem in the handling and utilization of kraft pulp slurries, sulfite pulp slurries and groundwood pulp slurries in papermaking machines, including machines used prior to formation of the fibrous matter, such as beaters, refiners, mixers and flow boxes. Similarly, many protein-containing systems such as solutions of soybean protein extract present foaming problems.

The antifoaming agents of this invention have proven to be especially active in defoaming kraft pulp stock and sulfite pulp stock used in the preparation of kraft and sulfite papers. Kraft pulp aqueous slurries have an alkaline pH in the range of 8–10, and sulfite aqueous pulp slurries have a pH which is about neutral. The antifoaming agents of this invention may also be used to control foam in groundwood aqueous pulp slurries in which the pH is acid in the range of about 4–5.5.

The active antifoaming agent of this invention is a fatty acid ester of polyoxypropylated glycerol. Polyoxypropylated glycerol is prepared by adducting 1,2-propylene oxide on glycerol. The polyoxypropylated glycerol used in this invention has a molecular weight in the range of 600–1,000, preferably about 650–800.

The fatty acid esters of the polyoxypropylated glycerol are prepared by esterifying the latter compound with a saturated or unsaturated aliphatic monocarboxylic acid having chain lengths of 12–22 carbons. Examples of such acids are lauric acid, myristic acid, palmitic acid, stearic acid, arachidic acid, behenic acid, myristoleic acid, palmitoleic acid, oleic acid, linoleic acid, elaeostearic acid, ricinoleic acid and the like. Mixtures of fatty acids having 12–22 carbons may also be used if desired.

For defoaming paper pulp slurries, the esters of the saturated fatty acids are preferred over the esters of the unsaturated fatty acids.

Polyoxypropylated glycerol has three esterfiable hydroxy groups. It may be esterified in accordance with the invention with at least 1 and up to 3 mols of the fatty acid per mol of polyoxypropylated glycerol. The diester, however, is preferred for antifoams for paper pulp stocks. It is often desirable to dilute the active antifoaming agent with a diluent to better facilitate metering of the antifoaming agent into the aqueous system. The more commonly used diluents cannot be used for lack of sufficient miscibility or because of loss of antifoam activity. The methyl esters of 16–18 carbon fatty acids, however, can be used to dilute the fatty acid esters of polyoxypropylated glycerol in amounts up to about 50% by volume without loss of antifoam activity. The diluted mixture is clear and homogeneous.

A convenient method for preparing fatty acid esters of polyoxypropylated glycerol is to heat a mixture of the acids and the polyoxypropylated glycerol to a temperature in the range of 200–240° C. under vacuum, e.g., 30–50 mm. Hg. The mol ratio of fatty acid to polyoxypropylated glycerol is the stoichiometric quantity required for the type of ester desired, the monoester, the diester or the triester. The esterification is carried to an acid value of less than 25, preferably about 10 or less. A catalyst is not required.

The following examples are illustrative of the embodiments of the antifoam compositions of this invention.

EXAMPLE I

| Ingredients: | Percent by weight |
|---|---|
| Stearic acid di-ester of polyoxypropylated glycerol (M.W.—700) | 50 |
| Polyoxyethylene glycol 400 di-oleate | 10 |
| Methyl stearate | 40 |

The above ingredients are blended with a mild application of heat until a clear and homogeneous formula is attained. The formula has a cloud point of 58° F., good freeze-thaw characteristics, and is readily emulsifiable with the water.

EXAMPLE II

| Ingredients: | Percent by weight |
|---|---|
| Stearic acid di-ester of polyoxypropylated glycerol (M.W.—700) | 60 |
| Liquid saturated fatty acidy (Emery 3101R) | 30 |
| Polyethylene glycol 400 di-oleate | 10 |

EXAMPLE III

| Ingredients: | Percent by weight |
|---|---|
| Stearic acid-diester of polyoxypropylated glycerol (M.W.—700) | 60 |
| Deodorized kerosene | 30 |
| Polyethylene glycol 400 di-oleate | 10 |

EXAMPLE IV

| Ingredients: | Percent by weight |
|---|---|
| Stearic acid di-ester of polyoxypropylated glycerol (M.W.—700) | 90 |
| Polyethylene glycol 400 di-oleate | 10 |

The polyethylene glycol 400 di-oleate in the above examples is an emulsifier for emulsifying the antifoam agent with aqueous systems. The distearate ester is not self-emulsifiable with aqueous systems and, hence, requires the presence of an emulsifier in the antifoaming formulation. Other emulsifiers which can be used with the antifoaming agents of this invention are polyethylene glycol 600 di-oleate or mono-oleate, polyethylene glycol 400 di-stearate or monostearate, alkali metal salts of petroleum sulfonates, isooctyl phenyl polyethoxy ethanol, oxyethylated $C_6$–$C_{18}$ fatty acid amides, dioctyl sodium sulfosuccinate, and the like.

Evaluation of the antifoaming agents

The composition of Example I was tested for its antifoaming activity on synthetic kraft pulp stock and neutral paper stock.

The kraft pulp stock test comparing the antifoam activity of a commercial antifoam and the antifoam of Example I was conducted as follows:

Two hundred ml. of a standard kraft pulp testing stock and a measured quantity of antifoaming agent were added to a calibrated tube having a coarse sintered glass aerator at the bottom. Air was bubbled into the stock through the aerator at a rate of 36 cc./min. The amount of foam developed after 30 seconds and 60 seconds of aeration was read and recorded.

The results of the tests are reported in the following table in which the composition of Example I was compared against the commercial antifoam sold as an antifoaming agent for paper stock.

TABLE I.—ANTIFOAM ACTIVITY ON KRAFT STOCK

| Antifoam | Dosage, p.p.m. | Foam Height | |
|---|---|---|---|
| | | 30 sec. | 60 sec. |
| Commercial Antifoam | 2.5 | 3.5 | 5.5 |
| Example I | 2.5 | 1.7 | 2.5 |

Two hundred ml. of a standard neutral paper testing stock and a measured quantity of a commercial antifoaming agent or the antifoaming agent of Example I were added to a calibrated tube having a coarse sintered glass aerator at the bottom. Air was bubbled through the aerator at a rate of 36 cc./min. The amount of foam developed after 30 seconds and 60 seconds of aeration was read and recorded.

The results of these tests are reported in the following table.

TABLE II.—ANTIFOAM ACTIVITY ON NEUTRAL PAPER STOCK

| Antifoam | Dosage, p.p.m. | Foam Height, cm. | |
|---|---|---|---|
| | | 30 sec. | 60 sec. |
| Example I | 15 | 1.9 | 2.1 |
| Example I | 10 | 2.8 | 3.5 |
| Commercial Antifoam | 15 | 2.4 | 3.1 |

In similar comparisons between the commercial antifoam and the antifoaming agents of this invention on other standard stock test medium, the antifoaming agent containing the stearic acid di-ester of polyoxypropylene glycerol (M.W.—700) required less dosage to suppress foam in the following stock solutions.

TABLE III

| Stock Solution | Dosage to Suppress Foam | |
|---|---|---|
| | Commercial Antifoam | Polyoxypropylene Glycerol Di-Stearate |
| Paper Mill Stock, pH 4.5, p.p.m. | 10 | 7 |
| Black Liquor, 17% solids, percent | 1 | 0.025 |
| Soybean protein extract stock, percent | 0.13 | 0.065 |

The antifoaming agents of this invention may be used in many processes to control or suppress foaming tendencies of foaming aqueous systems at dosages in the range of about 0.5 to 500 p.p.m. They may be used to control or suppress foam in the evaporation of black liquor or in the brown stock washing stage in the processing of black liquor. They may be used to control or suppress foam in the processing of soybean protein extract or other foaming protein-containing aqueous systems, in processing saponin aqueous solutions, or in foaming aqueous detergent-containing systems, including sewage treatment of detergent-containing sewage water.

In paper making processes, the antifoam can be used with effectiveness to control or suppress foam in stock chests, machine chests, stuffing boxes, headboxes, and/or in the paper forming stages in Fourdrinier or cylinder paper making machines.

I claim:

1. An ester of polyoxy-1,2-propylated glycerol having a molecular weight in the range of 600–1,000 and an aliphatic monocarboxylic acid having 12–22 carbons.

2. The di-ester of polyoxy-1,2-propylated glycerol having a molecular weight in the range of 600–1,000 and an aliphatic, monocarboxylic acid having 12–22 carbons.

3. An ester of polyoxy-1,2-propylated glycerol having a molecular weight in the range of 600–1,000 and stearic acid.

4. The di-ester of polyoxy-1,2-propylated glycerol having a molecular weight in the range of 600–1,000 and stearic acid.

References Cited
UNITED STATES PATENTS

| | | | |
|---|---|---|---|
| 1,959,930 | 5/1934 | Schmidt et al. | 260—410.6 |
| 2,233,382 | 2/1941 | De Groote et al. | 260—410.6 X |
| 2,948,757 | 8/1960 | Pruitt et al. | 252—321 X |
| 3,037,000 | 5/1962 | Bannerman | 252—321 X |

ALEX MAZEL, *Primary Examiner.*

CHARLES B. PARKER, HENRY R. JILES, *Examiners.*

ANTON H. SUTTO, *Assistant Examiner.*